Figure 1:
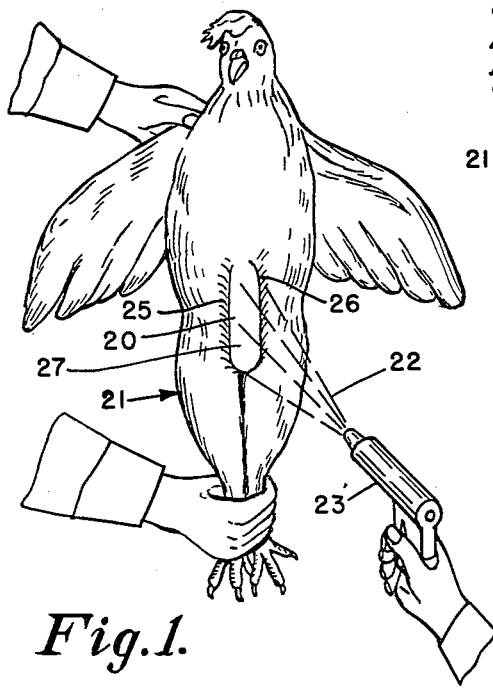

April 2, 1963    R. D. TILLOTSON    3,083,688
APPARATUS AND METHOD FOR PREVENTION OF SKIN
BLISTER IN DOMESTIC FOWL
Filed Oct. 17, 1961

INVENTOR.
RICHARD D. TILLOTSON
BY
Pearson + Pearson
ATTORNEYS

United States Patent Office 3,083,688
Patented Apr. 2, 1963

3,083,688
APPARATUS AND METHOD FOR PREVENTION OF SKIN BLISTER IN DOMESTIC FOWL
Richard D. Tillotson, Augusta, Maine, assignor to Arthur D. Little, Inc., Cambridge, Mass., a corporation of Massachusetts
Filed Oct. 17, 1961, Ser. No. 145,675
16 Claims. (Cl. 119—143)

This invention relates to apparatus for, and a method for prevention of skin blister in domestic fowl.

In the production of fowl, a common defect has been the appearance of skin blister on the skin covering the keel bone of male fowl, often at the age of ten to twelve weeks, the blister increasing in size until the fowl is marketed.

Heretofore it has been suggested that breast blisters develop as a sort of bursa or sac as a result of rubbing or irritation over the tip of the keel bone and treatment with diethylstilbestrol has been recommended. Such treatment has been intended to stimulate the laying down of additional fat under the skin, thereby giving some protection to the point of the keel. In a trial test mentioned in Profitable Poultry Management, 20th edition (1952), by Clarence E. Lee, published by the Beacon Milling Company, Inc., of Cayuga, New York, 29% of the birds treated with diethylstilbestrol had no breast blisters while only 15.6% of the untreated birds had no breast blisters. Since the remaining birds all had large, medium or small breast blisters, the importance of the problem is apparent as is the fact that the problem still requires solution.

Blistering of the skin over the keel bone occurs principally in the male domestic fowl, or cockerels, pullets apparently having an inherent defense thereagainst by reason of physical structure.

The development of blister-like formations on the keel of broilers, fryers and roasters, raised in batteries, in confined houses or on the range, has been on the increase; the greatest increase in formation of the blisters taking place when the cockerels are from twelve to sixteen weeks of age. The blister-like formations contain a sterile fluid and must be punctured with a sharp knife, without disfiguring the appearance of the bird, the fluid permitted to escape and the skin then pulled down tightly over the keel bone, before sale of the birds.

It is my belief that such skin blister is mainly due to roosting conditions, in the raising of heavy fowl and that it occurs because the fowl sit in chicken manure for long periods, the nitrates or other chemicals in the manure, plus the rubbing and irritation from lying on the keel, causing the blister. Regardless of whether or not my said theory of causation is correct, it has been found that the shield of this invention substantially reduces the occurrence of skin blister in domestic fowl.

The value of the fowl or chicken, is considerably reduced by the presence of skin blister and instead of being a grade A product, it becomes a grade B or grade C product. A loss of fifteen to thirty-five cents a pound in market price usually must be taken on each broiler having skin blister, depending on the size of the blister.

It has heretofore been proposed to provide each fowl, at about the age of four weeks, with a fabric garment covering the keel area and having straps which extend over the back or saddle. Obviously the dressing of a large flock of fowl, individually, in such a garment is a time consuming task and the straps tend to become tight during the rapid growth of the fowl. Such straps may prevent the fowl from moving its wings, or the straps must be placed under the wings, both conditions being confining and uncomfortable.

In the field of domestic animal production, it has been proposed to provide a heat reflecting covering on the major portion of the outer surface of the animal, adhered to the outer portion of the animal's coat and leaving a dead air space between the covering and the skin as in U.S. Patent 2,826,169 to Leveen, of March 11, 1958. Such a tent-like covering if applied to the keel area of a fowl, would be quickly picked off, especially when anchored only to the outer portion of the coat, or feathers, of the fowl.

It is the principal object of this invention to provide a buffer or shield over the keel area of a fowl which is firmly secured under the feathers on each opposite side of the keel bone of the fowl rather than by straps around the back and which can remain in place from the age of about eight weeks to a marketable age without being picked off by the fowl.

Another object of the invention is to provide a solidified barrier to direct contact with chicken litter on the keel area of a fowl, the barrier being supported only by being anchored under the breast and keel feathers of the fowl.

A further object of the invention is to provide a simple low cost and effective method for preventing skin blister in fowl by applying a liquified coating over the sensitive area of the fowl and under the feathers thereof and permitting the coating to solidify into a pliable shield.

Figure 2:
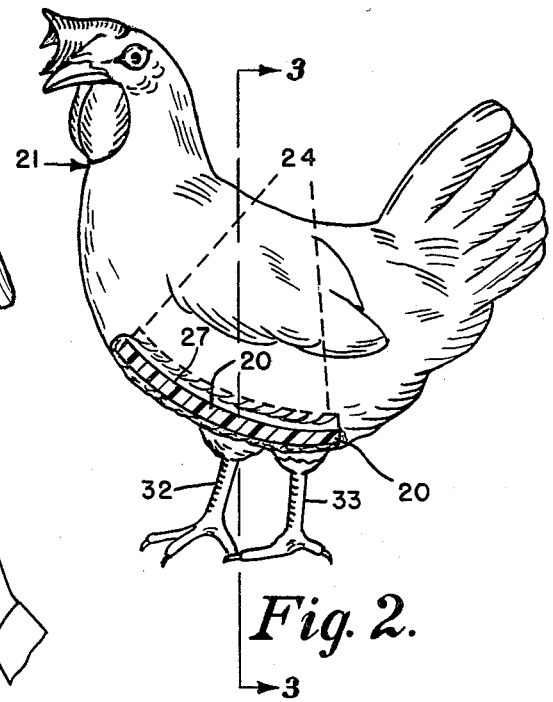
Figure 3:
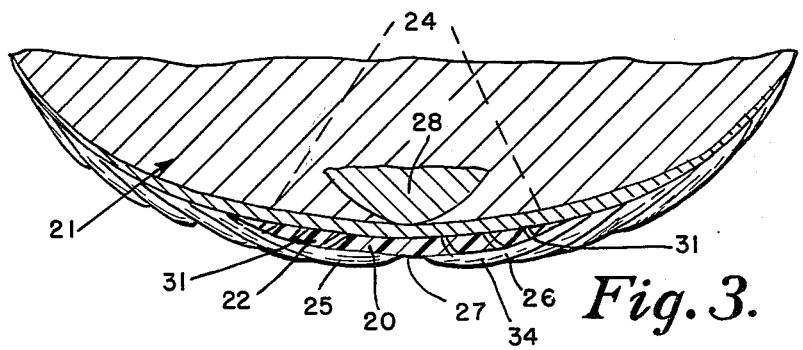
Figure 4:
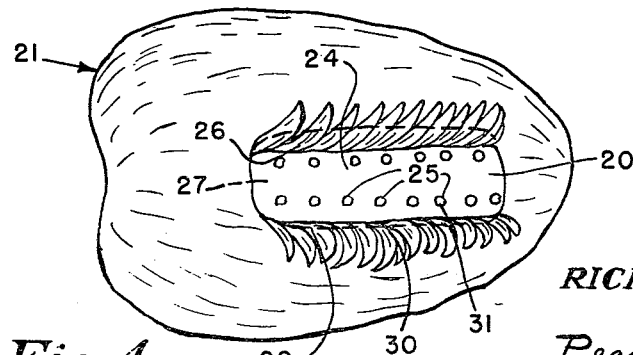

Other advantages and objects of the invention will be apparent from the claims, the description of the drawing and from the drawing in which:

FIG. 1 is a front elevation showing the protective shield of the invention being applied to a fowl at the age of about eight to ten weeks, FIG. 2 is a side elevation, partly in section, of the same shield, solidified on the same fowl as it appears when the fowl is ready for the market for example, as a three to four and one-half pound fryer, broiler or light roaster, FIG. 3 is an enlarged, diagrammatic sectional view, on line 3—3 of FIG. 2, showing the protective shield supported by, and firmly secured under the feathers of the fowl, and FIG. 4 is an enlarged, diagrammatic, bottom view of a fowl illustrating the feather pattern over the keel with parts broken away to show the shield of the invention anchored around the base of the feathers.

Domestic fowl raised for broiler and roaster production, in modern houses, increase in growth rapidly so that at about three months to sixteen weeks of age they may weigh about six to seven pounds and be ready for the market. With the often crowded conditions of houses, the constant exposure of the birds, from the age of eight weeks to ten weeks, to chicken manure when roosting, is believed to gradually develop the formations known as breast or skin blister. This is especially true with cockerels, the loose skin over the keel being subject to rubbing and irritation as well as being exposed to the active chemicals such as nitrates in which the birds roost.

As indicated in FIG. 1, in this invention, a protective shield 20 is applied over the entire keel bone area, this being the area upon which a fowl 21 sits or roosts. The shield 20 may be applied when the fowl is as young as four weeks old, to prevent any tendency toward blister, but preferably it is applied when the fowl has acquired a greater proportion of its final growth for example, at about eight weeks.

A convenient time for application of the shield is when the cockerels are separated from the pullets, usually at about eight to eleven weeks of age. The cockerels are treated in accordance with the invention, but the pullets usually do not require the treatment. Thus during the usual period in which the skin of the cockerels has heretofore been progressively tending to develop bister, namely eight to twelve weeks, in this invention the skin is protected and blister does not appear and increase in size during the twelve to sixteen weeks period. If the fowl is not marketed at three months, when it weighs about three to five pounds, the shield 20 may be permitted to remain in place until the fowl reaches six to seven pounds.

As indicated in FIGURE 2, the shield 20 on the fowl 21, which has reached about thirteen weeks of age, still conforms to the configuration of the body of the fowl and is still one piece, pliable and soft.

The shield 20 is applied as a solidifiable film forming material such as the fluid 22, preferably by spraying from a suitable spray gun 23 at a pressure of about ten p.s.i. The fluidized material 22 may be of any well known type capable of solidifying instantaneously, or in a reasonable time, after application, when exposed to an atmospheric environment or any other suitable means, for changing the substance 22 from a fluid to a solid state, may be used.

It has been found that the application of a film forming material to the keel area of a fowl, at a temperature above 140° F. causes the fowl to aggressively attack the film. On the other hand, at temperatures below 140° F. the warm salve-like application is ignored by the fowl upon release. Thermoset plastics which require temperatures of over 180° F. for setting are therefore not recommended. Materials which harden into a rigid, unyieldable shield are also not desirable because they cannot conform to the growth of the fowl. I prefer to use a composition formed of 25% microcrystalline mineral wax, 5% polyethylene and 70% natural resins, such as pine resins, which I call hereinafter a mineral wax composition for convenience. Cohesion of the material of shield 20 is essential to prevent cracking, but adhesion to the skin, while desirable when first applied, is not essential thereafter. The shield 20, after several days, separates from the skin but remains firmly anchored thereover because the edges of the shield are secured to the feathers bordering the bare skin in the keel bone area. The shield 20 could be formed of material such as wood pulp, or other fibrous material rubbed, sprayed or blown over the breast area of the fowl, the pulp forming a relatively thick, pliable shield of solidified pulp as the liquid therein evaporates.

I prefer to form the shield 20 of the mineral wax composition sprayed at a temperature of about 140° F. and at a pressure of about ten p.s.i. onto the keel bone area 24 of the fowl to part the feathery portions of the feathers 25 and 26 on each opposite side of the unfeathered exposed skin 27 on the keel bone 28, cover the skin 27 and to reach well below or under the outer portions 29 of the feathers. The pressure of the spray is useful in automatically parting the feathers but should not be so great as to harm the fowl. A suitable spray pressure will depend on the viscosity of the composition. The composition can, of course, be deposited with negligible pressure of application by extrusion or otherwise, or with pressure greater than 10 p.s.i. as a fine spray.

Upon solidifying, the shield 20 is thus firmly secured under the feathery portion 30 of the feathers with the quills such as 31 of the breast feathers, partially embedded therein and encircled thereby. The one piece shield 20 when so formed of solidified mineral wax composition is pliable, deformable, soft, and tacky enough to pick up a covering of chips or the like in the chicken litter. It remains firmly anchored to the breast feathers for at least six weeks after application despite growth of the bird and growth of the feathers.

The method of application of shield 20 by spraying avoids the time consuming task of dressing each fowl in a garment. Permitting the sprayed material to solidify under the feathers and around the quills provides a firm support for the solidified shield and prevents easy removal by claws or beak of the fowl or by other fowl. As shown diagrammatically in FIG. 3 the fluidized plastic material 22 when sprayed under pressure over the keel bone area 24, which includes the area between the legs 32 and 33 of the fowl 21, separates and blows aside the exposed faces 34 of the feathers 25 and 26 in the keel bone area, to uncover the skin 27. It will be apparent that if the coating were merely applied over the feathers, as a covering, the shield 20 might be easily peelable and tend to fall off the fowl under the attack of other fowl, or by reason of wear and tear, friction, rubbing, and the like during roosting and feeding in houses.

It is, therefore, essential that the fluidized material 22 pass between the portions of the feathers overlying the keel bone, contact the skin 27 and spread out laterally and longitudinally under the feathers. The coating will thus encircle or partially encircle at least some of the shafts, or quills, 31 of the feathers so that the exposed base of the shafts are firmly embedded in the material upon solidification thereof. The material 22 preferably intimately adheres to the exposed skin 27 along the breast bone, or keel 28, when first applied, gradually loosening therefrom as the fowl grows.

When a fowl 21 roosts, bearing the wax-like shield 20, the 103° F. body heat of the fowl plus the chemical heat of the roost litter tends to slightly melt or soften the shield to permit conformance with the shape of the body during roosting. When roosting pressure is released, the shield continues to hug the body of the fowl conforming to the change in body shape. Similarly as the fowl grows the shield 20 can conform to such growth without cracking or falling off. The skin 27 in the breast area 24 is thus continually protected by the shield 20 from contact with the chicken manure or litter of the battery floor and roost from the time of application, at four to ten weeks, through the critical stage of twelve to sixteen weeks and until the fowl has reached at least six to seven pounds weight. The shield 20 may be stripped from the fowl during defeathering along with the breast feathers.

In a controlled test conducted at Augusta, Maine, the following results were secured by the shield and method of this invention in the prevention of breast blister.

One hundred cockerels at the age of nine to ten weeks were divided into a treated group of fifty birds and an untreated group of fifty birds. The feathery portion of the feathers covering the bare skin on the keel bone area of each of the fifty treated birds was manually parted and the mineral wax composition ranging in thickness from 1/32 to 3/32 of an inch, was applied with a brush to cover an area about two inches wide and four inches long. The resulting wax coating was spread under and around the quills of the feathers bordering the bare skin area and solidified into a tacky, protective shield. At the age of thirteen weeks, forty-seven of the treated birds were free of skin blister while skin blister was found on three birds. The six percent occurrence of blister in the treated birds may indicate that three of the birds already had blister when separated for the test.

The untreated group of fifty birds grew under exactly similar conditions but at the age of thirteen weeks twenty-one birds had skin blister while twenty-nine birds were free of blister.

Best results have been secured when the mineral wax composition, which has a melting point of 125° F. to 180° F., is applied at a temperature of about 140° F. A coating of two thirty seconds of an inch has been found to be desirable. If too thin the coating may split or break and if too thick the coating may crack. Such a coating has been manually applied with a brush by four men at the rate of three or four hundred birds an hour. The coating was applied over a skin area about two inches wide and four inches long, the material spreading laterally under the feathers and longitudinally under the feathers at each end of the strip.

For reasons of cost it has been found that a satisfactory formulation for the shield of the invention is 70% rosin, 22% beeswax, 4% carnauba and 2% polyethylene. This formulation avoids the cost of microcrystalline wax and becomes a thin watery liquid at about 150° F. which can be readily sprayed under a suitable pressure. Although discharged from the spray gun at such temperature, the spray cools in its passage through the air and is deposited on the fowl at a temperature below 140° F. The deposited film becomes tacky upon cooling to 130° F. and causes no discomfort to the fowl.

The above mentioned formulations can be mechanically reinforced with suitable filler material especially when applied with a brush. In addition the film forming material can be applied with a spray gun, with the fluid pressure spreading the feathers, while a layer of filler material is simultaneously blown onto or into, the shield. Such filler material may consist of natural cellulosic fibres, synthetic organic fibres, carbon black, or may consist of mineral fillers such as asbestos fibres, pulverized chalk or the like.

It has been found advantageous to not only anchor the shield of the invention around the base of the feathers of the fowl, but to also fold the outer portions of such feathers inwardly, toward each other and across the keel bone, and embed the outer portions in the exterior tacky face of the shield.

In using the term fowl herein, I intend to include all domestic, relatively large, edible birds subject to skin blister such as chickens, turkeys and the like.

I claim:

1. In combination with a fowl, a continuous protective shield of solidified, cohesive material substantially covering the keel bone area of said fowl, said shield overlying and being in intimate contact with the exposed skin along said keel bone and extending laterally under the feathers along each opposite side of said keel bone, said shield being firmly secured to the base portions of said feathers lying adjacent the skin of the fowl and being independent of any straps extending around the body of said fowl.

2. A combination as specified in claim 1 wherein said solidified material is a soft, pliable, deformable wax-like thermo plastic.

3. A combination as specified in claim 1 wherein the shafts at the base portions of said feathers are embedded in, and encircled by, the solidified material of said shield.

4. A combination as specified in claim 1 wherein said shield is a tacky wax-like thermo plastic having a layer of protective coating substance intimately adhered to the exposed face thereof.

5. A combination as specified in claim 1 wherein said shield is about one thirty-second to three thirty-seconds of an inch in thickness and formed of 25% microcrystalline mineral wax, 5% polyethylene and 70% natural resins.

6. A combination as specified in claim 1 wherein said material is a thermo plastic and said shield is impervious.

7. A protective device for preventing skin blister in male fowl, said device comprising a cohesive, pliable, soft, protective shield covering, and in intimate contact with, the bare skin in the keel bone area of a male fowl aged about eight weeks, said shield extending under, and firmly secured to, the feathers of said fowl, on each opposite side of the keel bone for support thereby until said fowl reaches a marketable age.

8. A combination as specified in claim 7 wherein said shield is formed of a solidified thermo plastic material, slightly tacky and pliable at normal atmospheric temperatures but increasing in tackiness and pliability at temperatures slightly above the body temperature of a fowl of about 103° F.

9. A combination as specified in claim 7 wherein said shield is a solidified thermo plastic comprising parts of mineral wax, parts of polyethylene and parts of natural resins.

10. The method of preventing skin blister in fowl which comprises the steps of firmly securing to the breast feathers of a young fowl on each opposite side of the keel, a continuous, pliable, protective shield entirely covering the entire bare skin in the keel bone area of the fowl and permitting said shield to remain in place until said fowl has grown to marketable weight of about six to seven pounds.

11. A method as specified in claim 10 wherein said shield is sprayed on said fowl in liquid form to part the feathers covering said keel bone and to spread under and around the bases of said breast feathers, and said shield is then permitted to solidify.

12. The method of preventing skin blister in male fowl which comprises the steps of spraying at about 10 p.s.i. a liquid, solidifiable wax-like coating onto the bare skin on each side of the keel bone of the fowl while simultaneously blowing sidewise and separating the feathers surrounding said bare skin, when said fowl is between eight and ten weeks of age, then permitting said coating to spread and solidify into a tacky, pliable layer entirely covering the said skin area of said fowl and extending under said feathers and then permitting said layer to remain on said fowl until said fowl has reached a marketable age as a fryer, broiler or roaster.

13. The method of preventing skin blister in fowl which comprises the steps of spreading the feathers surrounding the keel area of the fowl until the bare skin in said keel area is exposed; then applying a continuous, solidifiable, tacky coating over said bare skin and under and around the base of the said feathers; then folding the outer portions of said feathers over the outer face of said coating and embedding the outer portions of said feathers therein and then permitting said coating to solidify on said fowl.

14. A combination as specified in claim 7 wherein said shield includes the following materials in approximately the following proportions, seventy percent rosin, twenty-two percent beeswax, four percent carnauba wax and two percent polyethylene.

15. A combination as specified in claim 7 wherein said shield is a solidified thermoplastic having a substantial proportion of filler therein.

16. A combination as specified in claim 7 plus a protective, pliable coating substantially covering said shield and intimately adhered to the exposed face thereof.

References Cited in the file of this patent

UNITED STATES PATENTS 2,826,169 Le Veen .............. Mar. 11, 1958